Figure 1:
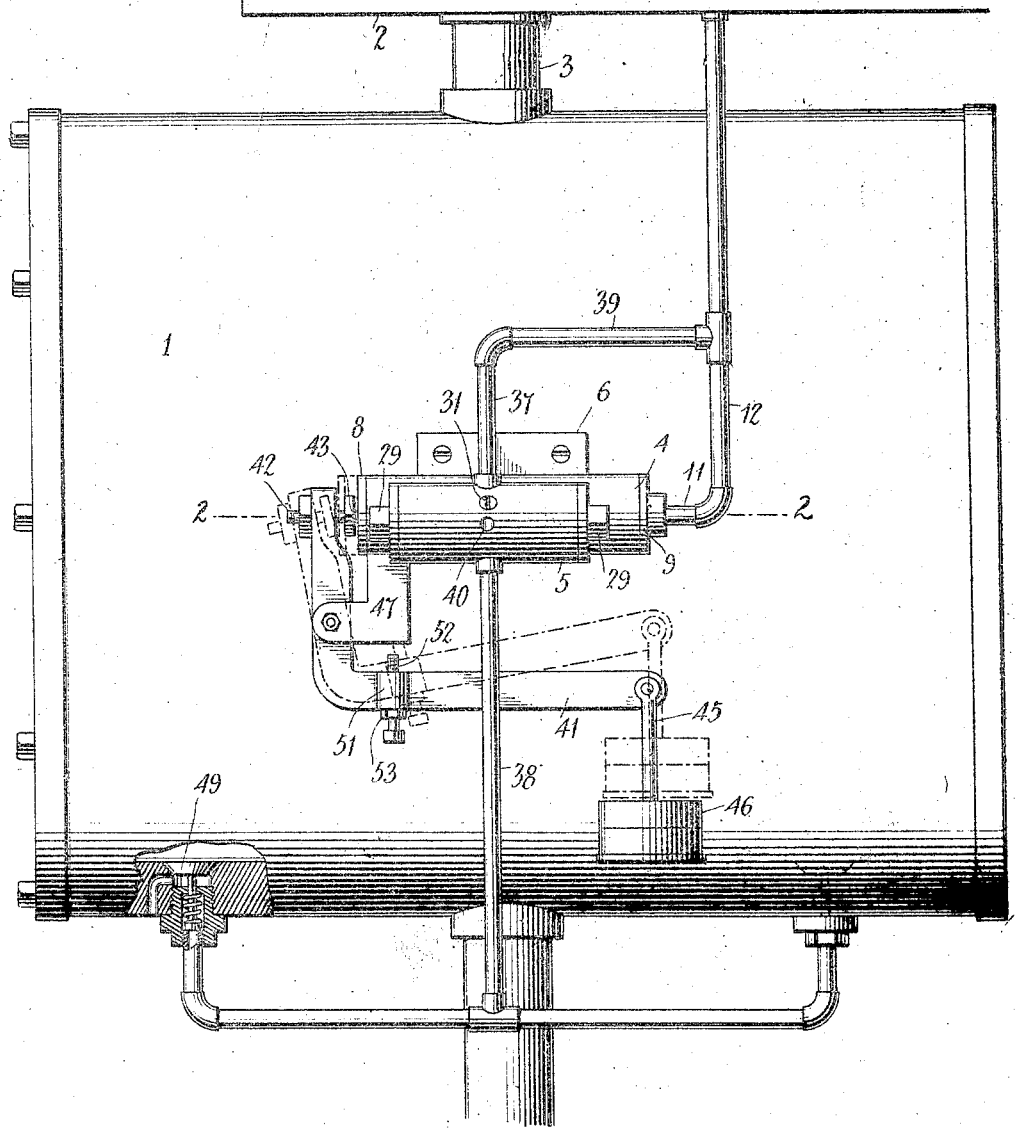

G. W. HUNNEYMAN.
REGULATOR FOR AIR COMPRESSORS.
APPLICATION FILED JAN. 9, 1908.

907,054.

Patented Dec. 15, 1908.

3 SHEETS—SHEET 1.

Witnesses

Inventor
George W. Hunneyman
By Chandlee Chandlee
Attorneys

G. W. HUNNEYMAN.
REGULATOR FOR AIR COMPRESSORS.
APPLICATION FILED JAN. 9, 1908.
907,054.
Patented Dec. 15, 1908.
3 SHEETS—SHEET 2.
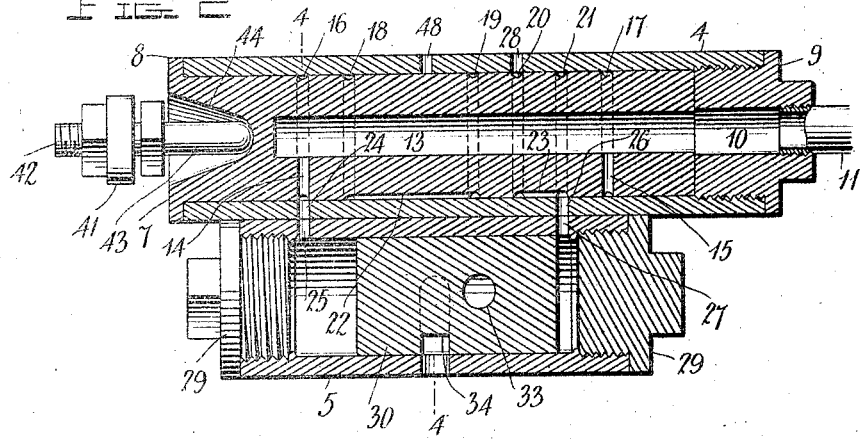
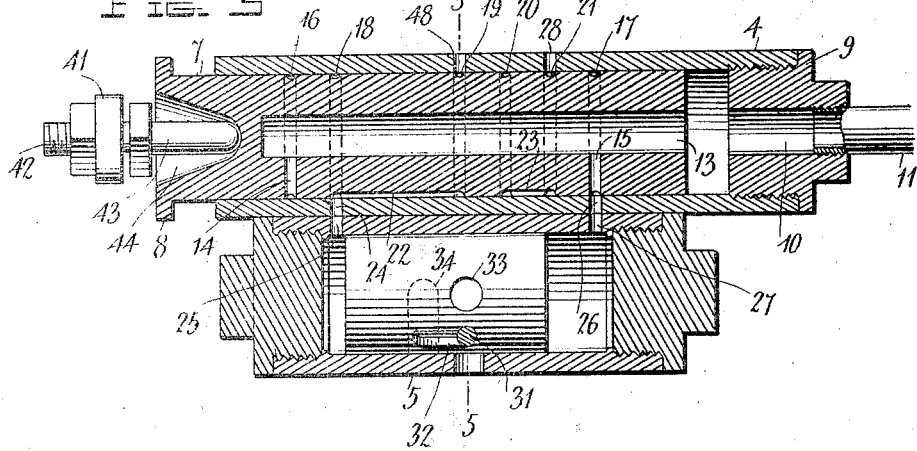
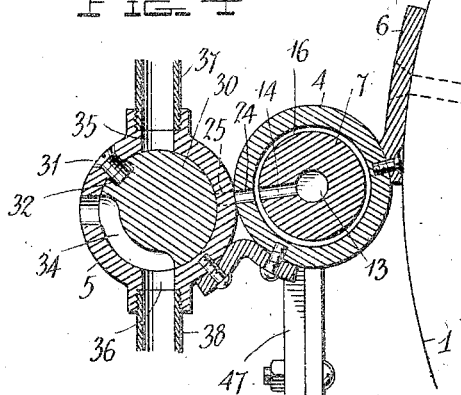
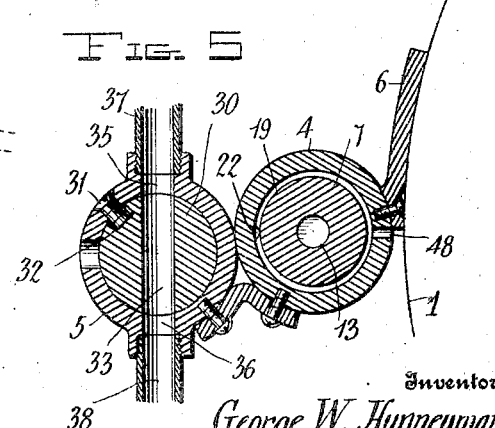
Witnesses
Inventor
George W. Hunneyman
By
Attorneys
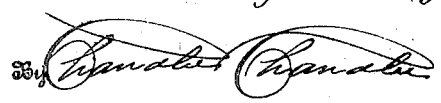

G. W. HUNNEYMAN.
REGULATOR FOR AIR COMPRESSORS.
APPLICATION FILED JAN. 9, 1908.

907,054.

Patented Dec. 15, 1908.

Witnesses

Inventor
George W. Hunneyman
By
Attorneys

UNITED STATES PATENT OFFICE.

GEORGE W. HUNNEYMAN, OF CONCORD, NEW HAMPSHIRE.

REGULATOR FOR AIR-COMPRESSORS.

No. 907,054.      Specification of Letters Patent.      Patented Dec. 15, 1908.

Application filed January 9, 1908. Serial No. 409,896.

*To all whom it may concern:*

Be it known that I, GEORGE W. HUNNEYMAN, a citizen of the United States, residing at Concord, in the county of Merrimack, State of New Hampshire, have invented certain new and useful Improvements in Regulators for Air-Compressors; and I do hereby declare the following to be a full, clear, and exact description of the invention, such as will enable others skilled in the art to which it appertains to make and use the same.

The present invention has reference to regulators for air compressors, and it aims, generally, to provide an exceedingly simple and effective automatically operated apparatus of that nature which is composed of but few parts, is quick acting and highly sensitive, will shut off the compressor at any pressure required by the adjusting weights, and will control such pressure by acting on either the inlet or the outlet valves of the compressor.

More especially, however, the invention resides in the particular construction of the plunger and valve disposed in the pressure and cut-off cylinders of the regulator; in the particular means employed for connecting the plunger to the weighted lever; and in the devices carried by the lever for regulating the variations of pressure in the air tank.

The above mentioned and other features which constitute the subject matter of this case are described in detail in the following specification, and will be understood from a consideration thereof, their preferred embodiment being illustrated in the accompanying drawings, in which corresponding parts are designated by similar reference numerals in the several views.

Figure 7:
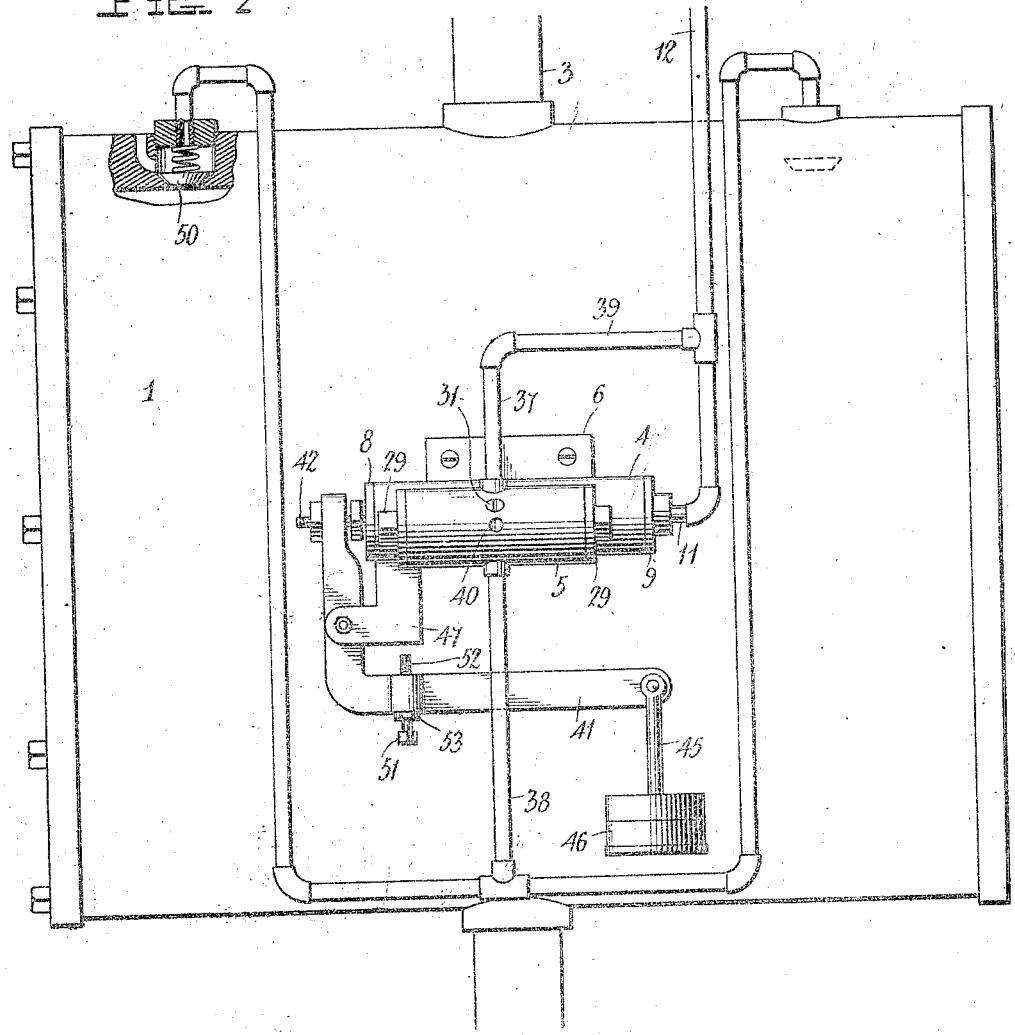
Figure 6:
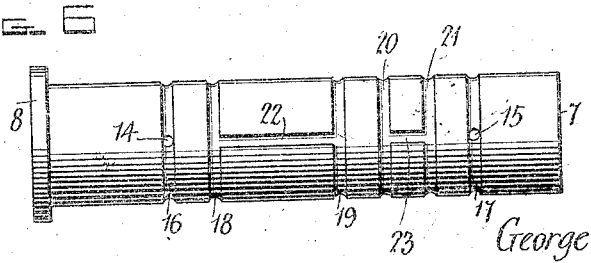

Of the said drawings:—Figure 1 is a front elevation of the improved regulator attached to an air-compressor. Fig. 2 is a horizontal section on the line 2—2 of Fig. 1, showing the position of the plunger and cut-off valve when the compressor is in operation. Fig. 3 is a section on the same line, showing the position of said members when the compressor is at rest. Figs. 4 and 5 are cross-sections taken on the lines 4—4 and 5—5 of Figs. 2 and 3. Fig. 6 is a plan view of the plunger. Fig. 7 is a view similar to Fig. 1, showing the exhaust pipe from the valve cylinder connected to the outlet valve of the compressor.

Referring more particularly to the drawings, 1 designates generally, the compressor cylinder, 2 the tank or receiver, and 3 the connecting pipe between the same. As any ordinary type of compressor and receiver may be used, an extended description of said parts is unnecessary.

The regulator, which forms the subject of this case, comprises a pressure cylinder 4, and a valve or cut-off cylinder 5, disposed in juxtaposition to each other and connected in any preferred manner. The main or pressure cylinder 4 carries a plate 6 by means of which, it is secured to the compressor cylinder 1 and has slidably fitted therein, a plunger 7 whose outer end is provided with an integral annular flange 8 adapted to contact with the adjacent end of the cylinder 4 when the plunger has reached the limit of its inward movement. In the opposite end of said cylinder, is threaded a plug or bushing 9 through which an axial bore 10 is formed, the bore being adapted to receive the branch 11 of a pipe 12, the last-mentioned pipe communicating with the receiver 2.

The plunger 7, as shown in Fig. 2, has formed therein a longitudinal bore 13 which opens through the inner end thereof and terminates at its other end short of the outer end of the plunger, said bore communicating adjacent its opposite ends with a pair of annular channels 16 and 17, formed upon the periphery of the plunger, such communication being effected by means of ports 14 and 15 formed transversely of the plunger, the ports opening at opposite ends through the bore and the channels. The plunger is further provided with a series of four peripheral channels 18, 19, 20 and 21, the first two channels being connected by a cross channel 22, and the last two channels by a similar channel 23. The channels 18, 19, 20 and 21 are formed between the channels 16 and 17 which serve as inlet channels, and are likewise annular in shape.

In the normal position of the plunger, *i. e.*, at the limit of its inward movement, the channel 16 is disposed in alinement with a pair of registering ports 24 and 25, formed through the casings of the cylinders 4 and 5, while the channel 21 alines in like manner with a pair of registering ports 26 and 27, likewise formed through said casings. In such position, the channel 20, which communicates with the channel 21 alines with port 28 formed through the casing of the first-mentioned cylinder upon the opposite side from that through which the ports 24 and 26 are formed.

Slidable within the cylinder 5, whose ends are closed by threaded plugs 29, is a valve 30 guided in its movements by a screw 31 whose stem extends through an opening formed in the casing of said cylinder and has its free end projecting into a longitudinal groove 32 formed upon the adjacent side of the valve. The valve is further provided with a vertical channel 33 formed therethrough towards one end, and an exhaust opening 34 formed in one side thereof, the channel 33 being adapted to register during the movement of the valve with diametrically opposite inlet and outlet openings 35 and 36 formed in the upper and lower walls of the casing of the valve of the cylinder, into which last mentioned openings extend the inner ends of upper and lower pipes 37 and 38, the pipe 37 being a branch of a pipe 39, which communicates with the upper section of the pipe 12, and, in consequence, with the receiver 2. The opening 34 in the valve is in like manner adapted to register with an exhaust opening 40 formed in the side of the casing of the cylinder 5.

The plunger is maintained normally at the limit of its inward movement by means of an angle lever 41, the vertical arm of which is connected by a screw 42 with a pin 43, whose free end extends into a socket 44 formed in the flanged outer end of the plunger, the pin and plunger being connected in any preferred manner. The horizontal arm of said lever has pivoted to its free end a weight carrying rod 45 upon which the weights 46 are supported. The lever is carried by an L-shaped bracket 47 to which its shorter arm is pivoted, said bracket being secured to the casing of the cylinder 4. When the plunger is in such position, and sufficient weights have been disposed upon the rod 45 to balance the required pressure, in the receiver, the air entering the pressure cylinder through the bore of the plug 9 will pass through the bore 13 of the plunger and be exhausted into the valve cylinder through the port 14, the channel 16, and the ports 24 and 25; the air pressure within the valve cylinder, forcing the valve rearwardly, so as to bring the channel 33 out of alinement with the openings 35 and 36, excessive pressure within the valve cylinder being prevented by the registration of the exhaust openings 34 and 40. When, however, the pressure within the receiver reaches an excessive point, the pressure of the air within the cylinder 4, will force the plunger outwardly against the action of the weight, thus bringing the inlet channel 17 into registration with the ports 26 and 27 and the channels 18 and 19 into registration with the ports 24 and 25, and 48, the last mentioned port being formed in the wall of the cylinder 4 adjacent the port 28. The air is thus free to flow into the valve cylinder through the ports 26 and 27 so as to effect a forward movement of the valve, such movement exhausting the air in the forward end of the valve cylinder through the ports 24 and 25, the channels 18 and 19, and the port 48, and at the same time, alining the channel 33 with the openings 35 and 36, whereupon the air is free to flow through the pipes 39 and 37 and the pipe 38 to the inlet valve 49 of the compressor cylinder 1, raising said valve from its seat and instantly stopping the compressor. Upon the consequent decrease of the pressure within the receiver, the plunger is returned to its normal position by the action of the weighted lever, so as to bring the channel 16 again into registration with the ports 24 and 25, whereupon the valve is moved rearwardly by the pressure of the air flowing into the valve cylinder, the movement of the valve cutting out the communication between the pipes 37 and 38, whereupon the compressor valve is free to return to its seat, thus permitting the compressor to start.

In the construction shown in Fig. 7, the position of the valve 30 within its cylinder is reversed, so that in the normal position of the valve, communication between the pipes 37 and 38 is effected by the registration of the channel 33 therewith, the last mentioned pipe communicating in such instance with the outlet valve 50 of the compressor cylinder, which valve is thus held against its seat, until the movement of the valve 30 consequent upon the excessive pressure in the receiver.

The invention further contemplates the provision of means for regulating the variations of pressure within the receiver, and to this end, the longer arm of the lever 41 is provided with an integral lateral shoulder 51 having a threaded vertical opening formed therethrough, in which opening, the shank of a threaded bolt 52 is fitted, the shoulder being located directly beneath the bracket 47, so that upon the adjustment of the bolt its free upper end will approach or recede from the lower face of said bracket. It is therefore possible to accurately regulate the extent of the outward movement of the plunger inasmuch as such movement will decrease as the bolt is moved towards the bracket and increase when it is moved away from the same. The bolt is retained in adjusted position by a lock nut 53.

It will be apparent from the foregoing that the regulator is operated automatically by the pressure of the air within the plunger or main pressure cylinder 4, the movement of the plunger effecting that of the valve which in turn, opens or cuts out communication between its cylinder and the compressor cylinder, and, in consequence, with the receiver.

While the preferred form of the regulator is shown in the drawings, the invention is not intended to be limited to the exact details of construction illustrated, as modifications and changes may obviously be made within the scope of the appended claims.

What is claimed is:

1. The combination, with a compressor and a receiver connected together, said compressor being provided with an air-inlet valve, of a regulator comprising a pair of juxtaposed cylinders having a pair of port communications with each other, one of said cylinders being formed with diametrically-opposite openings; an inlet pipe having one end fitted in one of said openings and the other end communicating with the receiver; an exhaust pipe having one end fitted in the other opening and the other end communicating with said inlet valve for operating the same; a valve slidable within said cylinder and formed with a transverse channel movable into and out of registration with said openings during the movements of the valve, to open and cut out communication between the inlet and exhaust pipes, a plunger slidable within the other cylinder and arranged to open and close said ports; means for normally holding the plunger at the limit of its inward movement; and an inlet pipe having one end communicating with the receiver and the other end with the interior of the last-mentioned cylinder.

2. The combination, with a compressor and a receiver connected together, said compressor being provided with an air-inlet valve, of a regulator comprising a pair of juxtaposed cylinders having a pair of port communications with each other, one of said cylinders being formed with diametrically-opposite openings; an inlet pipe having one end fitted in one of said openings and the other end communicating with the receiver; an exhaust pipe having one end fitted in the other opening and the other end communicating with said inlet valve, for operating the same; a valve slidable within said cylinder and formed with a transverse channel movable into and out of registration with said openings during the movements of the valve, to open and cut out communication between the inlet and exhaust pipes; a plunger slidable within the other cylinder and formed with a longitudinal bore and with a pair of spaced channels communicating therewith and movable alternately into and out of alinement with the adjacent port during the movements of the plunger; means for normally holding the plunger at the limit of its inward movement; and an inlet-pipe having one end communicating with the receiver and the other end with the bore of said plunger.

3. The combination, with a compressor and a receiver connected together, said compressor being provided with an air-inlet valve, of a regulator comprising a pair of juxtaposed cylinders having a pair of port communications with each other, one of said cylinders being formed with a pair of diametrically-opposite inlet and exhaust openings, and the other cylinder with a pair of exhaust openings; an inlet pipe having one end fitted in the inlet opening in the first named cylinder and the other end communicating with the receiver; an exhaust pipe having one end fitted in the exhaust opening in said first named cylinder and the other end communicating with said inlet valve, for operating the same; a valve slidable within said first named cylinder and formed with a transverse channel movable into and out of registration with said openings during the movements of the valve, to open and cut out communication between the inlet and exhaust pipe; a plunger slidable within the second named cylinder and formed with a longitudinal bore and with two sets of circumscribing channels, one channel of each set having a direct communication with the bore and being arranged for movement into and out of alinement with the adjacent port, and another channel of each set being arranged for movement into and out of alinement with the adjacent exhaust opening in said second named cylinder, during the movements of the plunger; means for normally holding the plunger at the limit of its inward movement; and an inlet-pipe having one end communicating with the receiver and the other end with the bore of said plunger.

4. The combination, with a compressor and a receiver connected together, said compressor being provided with an air-inlet valve, of a regulator comprising a pair of juxtaposed cylinders having a pair of port communications with each other, one of said cylinders being formed with a pair of diametrically-opposite inlet and exhaust openings, and the other cylinder with a pair of exhaust openings; an inlet pipe having one end fitted in the inlet opening in the first named cylinder and the other end communicating with the receiver; an exhaust pipe having one end fitted in the exhaust opening in said first named cylinder and the other end communicating with said inlet valve, for operating the same; a valve slidable within said first named cylinder and formed with a transverse channel movable into and out of registration with said openings during the movements of the valve, to open and cut out communication between the inlet and exhaust pipes; a plunger slidable within the second named cylinder and formed with a longitudinal bore and with two sets of three parallel circumscribing channels, one channel of each set having a direct communication with the bore and being arranged for movement into and out of alinement with the adjacent port, the remaining two channels of each set having a direct communication with each other, one of said remaining channels of each set being arranged for movement into and out of alinement with said adjacent port, and the other remaining channel with the adjacent exhaust opening in said second named cylinder, during the movements of the plunger; means for normally holding the plunger at the limit of its inward movement; and an inlet-pipe having one end communicating with the receiver and the other end with the bore of said plunger.

In testimony whereof, I affix my signature, in presence of two witnesses.

GEORGE W. HUNNEYMAN.

Witnesses:
 CHAS. T. PAGE,
 WILBUR J. PAGE.